(12) United States Patent
Koitabashi

(10) Patent No.: US 7,474,819 B2
(45) Date of Patent: Jan. 6, 2009

(54) CONTACTLESS CONNECTOR

(75) Inventor: Hiroyuki Koitabashi, Komaki (JP)

(73) Assignee: Chubu Nihon Maruko Co., Ltd., Aichi (JP)

( * ) Notice: Subject to any disclaimer, the term of this patent is extended or adjusted under 35 U.S.C. 154(b) by 165 days.

(21) Appl. No.: 11/353,764

(22) Filed: Feb. 14, 2006

(65) Prior Publication Data

US 2006/0202135 A1 Sep. 14, 2006

(30) Foreign Application Priority Data

Oct. 3, 2005 (JP) .............................. 2005-290472

(51) Int. Cl.
G02B 6/26 (2006.01)
G02B 6/42 (2006.01)

(52) U.S. Cl. .............................. 385/26; 385/18; 385/25

(58) Field of Classification Search .................... 385/25, 385/26, 16, 18, 19, 31, 39
See application file for complete search history.

(56) References Cited

U.S. PATENT DOCUMENTS

| 4,447,114 | A | 5/1984 | Koene |
| 4,530,567 | A | 7/1985 | Simon |
| 5,442,721 | A * | 8/1995 | Ames ........................... 385/26 |
| 6,353,693 | B1 | 3/2002 | Kano et al. |
| 6,434,293 | B1 * | 8/2002 | Igeta et al. ..................... 385/25 |
| 6,759,759 | B2 * | 7/2004 | Kojima et al. ................. 307/10.1 |
| 6,937,787 | B2 * | 8/2005 | Schilling et al. ............... 385/26 |
| 6,980,714 | B2 * | 12/2005 | Lo et al. ........................ 385/26 |
| 7,010,191 | B2 * | 3/2006 | Poisel et al. ................... 385/25 |
| 7,043,114 | B2 * | 5/2006 | Popescu ........................ 385/26 |
| 7,130,501 | B2 * | 10/2006 | Will et al. ...................... 385/18 |
| 7,142,747 | B2 * | 11/2006 | Oosterhuis et al. ............ 385/26 |
| 2004/0012471 | A1 * | 1/2004 | Kojima et al. ................ 336/120 |

FOREIGN PATENT DOCUMENTS

| EP | 0 488 205 | 6/1992 |
| JP | 57-138231 | 8/1982 |
| JP | 60-40002 | 9/1985 |
| JP | 60-206334 | 10/1985 |
| JP | 61-24961 | 7/1986 |
| JP | 3-16060 | 3/1991 |
| JP | 5-134140 | 5/1993 |
| JP | 08-160326 | 6/1996 |
| JP | 09-308625 | 12/1997 |
| JP | 2002-075760 | 3/2002 |
| JP | 2002-280239 | 9/2002 |
| JP | 2004-116018 | 4/2004 |

* cited by examiner

*Primary Examiner*—Kevin S Wood
*Assistant Examiner*—John M Bedtelyon
(74) *Attorney, Agent, or Firm*—Greer, Burns & Crain, Ltd.

(57) ABSTRACT

The contactless connector comprises a rotation-side light element on a rotating body that rotates about an axis of rotation and a fixed side light element on a fixed body that is fixed, and the rotating body further comprises a reflective body that rotates about the axis of rotation. The two light elements are constituted so that a light path is formed between the two light elements when a specified fixed-side light element is located on a light path line segment where light that is emitted from a specified rotation-side light element is reflected by the reflective body. The reflective body is rotated at half the rotation speed of the rotating body.

11 Claims, 13 Drawing Sheets

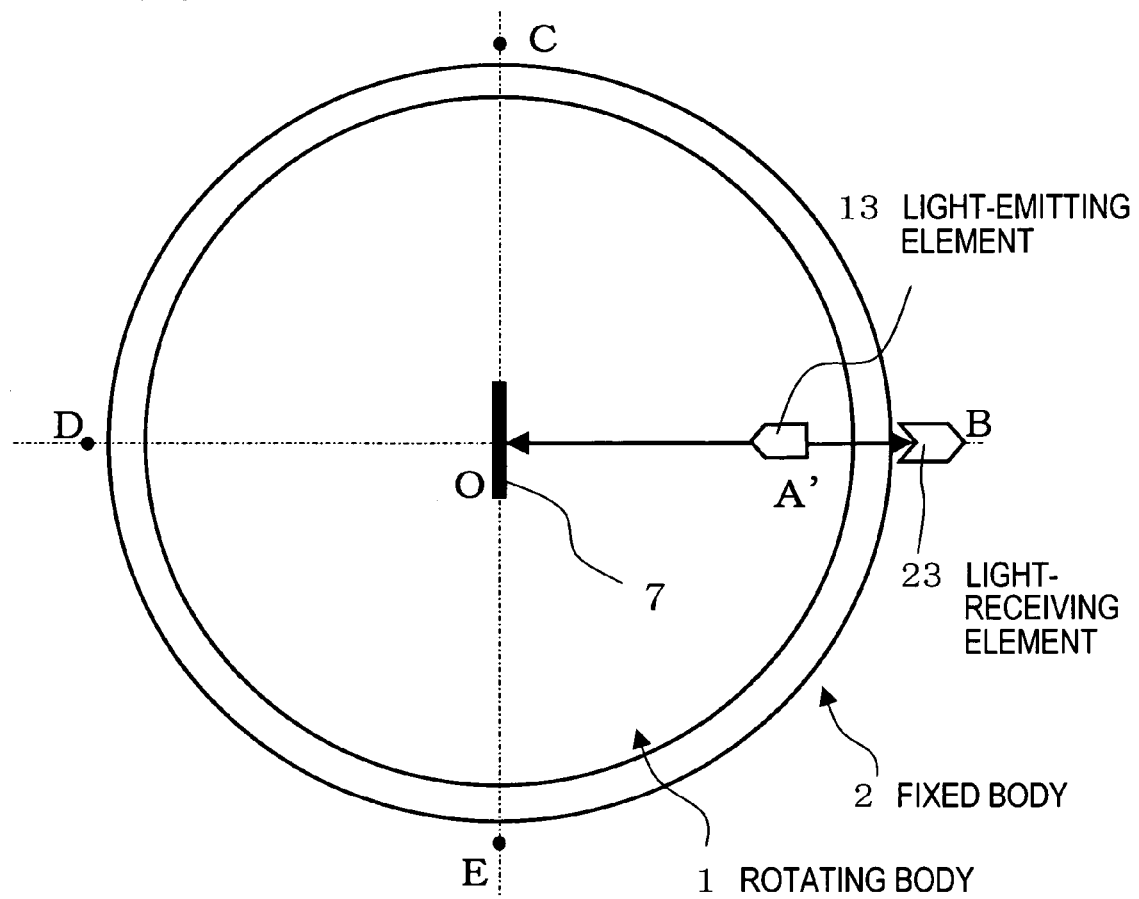

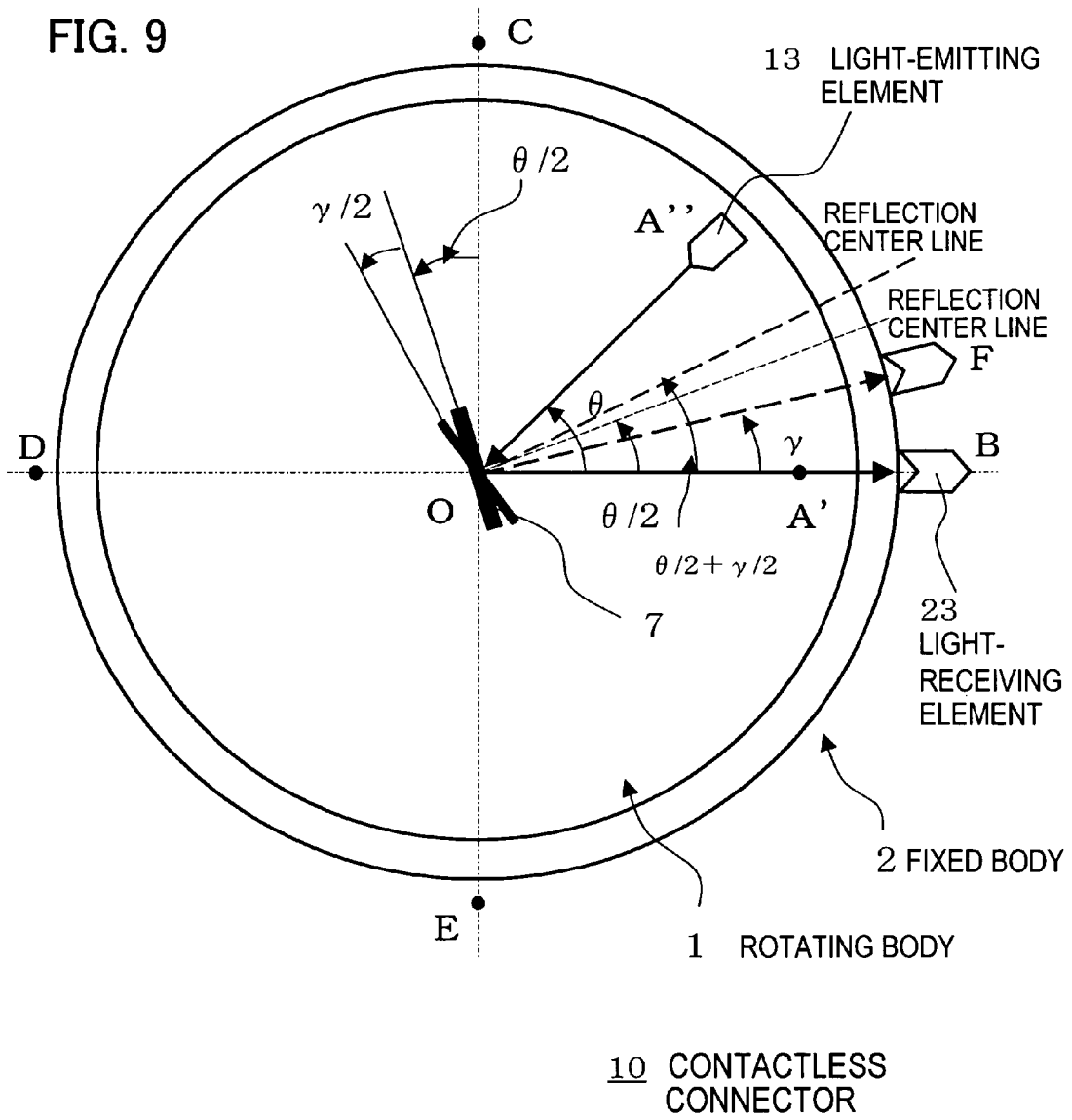

CONTACTLESS CONNECTOR

CROSS-REFERENCE TO RELATED APPLICATIONS

This application is based upon and claims the benefit of priority from the prior Japanese Patent Application No. 2005-290472, filed on Oct. 3, 2005, the entire contents of which are incorporated herein by reference.

BACKGROUND OF THE INVENTION

1. Field of the Invention

The present invention relates to a contactless connector that sends and receives data contactlessly. More particularly, the present invention relates to a contactless connector that sends and receives data contactlessly between a light-emitting body or light-receiving body of a rotating-body and a light-receiving body or light-emitting body of a fixed body that lie opposite the light-emitting body or light-receiving body of the rotating body via a reflective body provided in the rotational axis position of the rotating body.

2. Description of the Related Art

Conventionally, data has been sent and received between a rotation side and a fixed side in a variety of systems. For example, a camera is provided on a stand capable of rotating and a video signal or the like from the camera is transmitted to a signal processing portion on the fixed side, and so forth. In this case, the video signal from the camera is transmitted to the fixed-side signal processing portion by connecting wiring directly between the camera and the signal processing portion. Further, as a result of the advances in technology from wiring to wireless recently, it is now possible to send and receive data between the rotation side and fixed side even when wiring is not directly connected.

However, although power must be supplied to the rotation side in order to allow image pick up operations and so forth to be performed on the rotation side, there has been the problem that it is difficult to supply power contactlessly from the fixed side to the rotation side.

As a result, conventionally, a plurality of light-emitting elements are provided at the top of a disk-shaped rotating body and a plurality of light-receiving elements are provided in a position on the fixed-body side opposite the light-emitting elements to send and receive data contactlessly and a rotating transformer is constituted between the rotation side and the fixed side to implement the supply of power contactlessly from the fixed side to the rotation side (Japanese Patent Application Laid Open No. 2002-75760, for example).

However, Japanese Patent Application Laid Open No. 2002-75760 is not necessarily limited to the possibility of sending all data from the light-emitting elements of the rotating body to the light-receiving elements of the fixed body when the data communication speed increases. That is, in the case of Japanese Patent Application Laid Open No. 2002-75760, the light path from the light-emitting element is sequentially switched to another light-emitting element so that the contactless optical connection between the light elements is not broken in accordance with the rotation of the rotating body. With such a switching method, there has been the problem that the continuity of high speed communications cannot be secured when data transmissions faster than the processing time for switching the light path are required.

SUMMARY OF THE INVENTION

Further, the present invention is conceived in view of the above problems and an object of the present invention is to provide a contactless connector for which the continuity of high speed communications is secured.

In order to achieve the above object, the present invention is a contactless connector comprising a rotation-side light element provided on a rotating body that rotates about an axis of rotation, and a fixed-side light element provided on a fixed body, data being sent and received in a contactless between the rotation-side light element and the corresponding fixed-side light element, wherein the rotating body comprises a reflective body that reflects light emitted from the rotation-side light element or the fixed-side light element in the rotation-axis position; the contactless connector further comprising: a light path formed via the reflective body between the rotation-side light element and the fixed-side light element is substantially orthogonal to the axis of rotation; wherein the light path is formed via the reflective body between the rotation-side light element and the fixed-side light element so that the rotation-side light element or the fixed-side light element receive reflected light from the reflective body. As a result, light that is emitted from the rotation-side light element that functions as a light-emitting body irrespective of its location in accordance with the rotation of the rotating body, for example, is reflected by the reflective body and a light path that is always unbroken can be implemented for travel toward the fixed side light element that functions as a specified light-receiving body, whereby communication continuity is secured.

Further, the present invention is the contactless connector, wherein the rotation-side light element is provided on a disk face of the rotating body that is orthogonal to the axis of rotation, and the fixed-side light element is provided on a planar face of the fixed body that is substantially parallel to the disk face of the rotating body. As a result, the light path that is formed via the reflective body between the rotation-side light element and the fixed-side light element, for example, is formed in a plane that is perpendicular to the axis of rotation, whereby communication continuity is secured in this plane.

In addition, the present invention is the contactless connector, further comprising a detection portion that detects the rotation speed or rotation angle of the rotating body, and a reflective body driving portion that drive-controls the rotation speed or rotation angle of the reflective body by using data detected by the detection portion. As a result, for example, the rotating body can be driven and controlled at the desired rotational speed or rotation angle.

Furthermore, the present invention is the contactless connector, further comprising a computing portion that computes the rotation speed or rotation angle of the reflective body to constitute the light path from any of the rotation-side light element to any of the fixed-side light element by using the data detected by the detection portion. As a result, even when the rotating body is rotating, for example, an input value for drive-controlling the rotating body at an optional rotation speed or rotation angle can be calculated and inputted.

Further, the present invention is the contactless connector, wherein the reflective body driving portion is inputted a value of half of rotation speed or rotation angle of the rotating body when the rotation body is rotating or stationary; further comprising a connector portion that always connects the light path of the light from the specified light element to the specified light element; and a switch portion that switch the light path of the light from the specified light element to the specified light element, wherein the connector portion and switch portion are same construction. As a result, for example, a device that possesses a connector function such that, even when the rotating body is rotating, by driving the reflective body at a rotation speed or rotation angle that is half that of the rotating body, light compulsorily travels to a specified fixed-side light-receiving body even when the position of the rotation-side light-emitting body changes as a result of the rotation of the rotating body and a device that possesses a switch function by driving the reflective body at a set angle from the outside are possible. Further, naturally, a device that also possesses a connector function and a device that possesses a switch function when stationary can be obtained.

In addition, the present invention is the contactless connector, wherein the rotation-side light element is provided in a plurality in any positions on a disk face of the rotating body, the fixed-side light element is provided in a plurality on the fixed body so that the light path is formed between the respective fixed-side light elements and the respective rotation-side light elements via the reflective body when the fixed-side light element is located on a light path line segment of incidence and reflection of the reflective body with the rotation-side light element. As a result, by using a plurality of rotation-side light elements and fixed-side light elements, for example, an unbroken light path is formed and multiple channel data can be sent and received contactlessly.

Furthermore, the present invention is the contactless connector, wherein the rotation-side light element having a light-emitting function and a rotation-side light element having a light-receiving function are arranged mixed in any positions on a disk face of the rotating body, the fixed-side light element having a light-receiving function for receiving the light emitted from the rotation-side light element having the light-emitting function and the fixed-side light element having a light-emitting function for emitting the light toward the rotation-side light element having the light-receiving function are arranged mixed on the fixed body, and the fixed-side light element having the light-receiving function and the fixed-side light element having the light-emitting function are arranged mixed so that, when the fixed-side light element having the light-emitting function or the fixed-side light element having the light-receiving function is located on a light path line segment of incidence and reflection of the reflective body with the rotation-side light element having the light-receiving function or the rotation-side light element having the light-emitting function, the light path is formed respectively between the rotation-side light element having the light-emitting function and the rotation-side light element having the light-receiving function via the reflective body. As a result, because a light element having a light emission function and a light element having a light reception function, for example, are arranged mixed on a rotating body and a fixed body, data of multiple channels that is simultaneously bidirectional can be sent and received contactlessly.

Moreover, the present invention is the contactless connector, wherein the rotation-side light element and the fixed-side light element, which are in a face that is substantially perpendicular to the axis of rotation, are provided in a plurality of a stages respectively substantially parallel to the axis of rotation on the rotating body and the fixed body, and the light path is formed between the rotation-side light element and the fixed-side light element in each stage. As a result, multiple channel data can be sent and received contactlessly, for example.

In addition, the present invention is the contactless connector, further comprising, a switching portion for being inputted data which is received by the rotation-side light element or the fixed-side light element, and for outputting the data to a desired output terminal among a plurality of output terminals. As a result, input data can be inputted to the output port desired by the user, for example.

Further, the present invention is the contactless connector, further comprising, a rotating transformer that is constituted by a transformer core and a transformer winding for each of the rotating body and the fixed body. As a result, a contactless supply of power can be executed between the rotating body and fixed body, for example.

In addition, the present invention is the contactless connector, further comprising, a blind mating portion, in a structure that permits mutual mating between the rotating body and the fixed body, which allows a predetermined light path to be formed by computing the initial angle of the reflective body between the rotation-side light element and the fixed-side light element irrespective of the mating position of the rotating body in the direction of rotation of the rotating body. As a result, a contactless connector having a blind mating function between the rotating body and fixed body can be provided.

Further, the present invention is the contactless connector, wherein the fixed-side light element is provided at a different height from that of the rotation-side light element in the direction of the axis of rotation, and the rotation-side light element is provided at an angle so that the light path is formed between the rotation-side light element and the fixed-side light element, with respect to a planar disk of the rotating body that is orthogonal to the axis of rotation. As a result, light that is emitted from the rotation-side light element can be received by a fixed-side light element having a light reception function via the reflective body without the light path being obstructed by the rotation-side light element itself that functions as a light-emitting body, for example.

Moreover, the present invention is the contactless connector, wherein the reflective body, when the reflective body is located between the rotation-side light element and the fixed-side light element in accordance with the rotation of the rotating body, comprises a reflective face at a distance of pencil of light of the light path from the axis of rotation, the reflective body is a structure that prevents obstruction of the light path between the rotation-side light element and the fixed-side light element, and both faces of the reflective body are mirror faces. As a result, light that is emitted from the rotation-side light element that functions as a light-emitting body can be received by the fixed-side light element that functions as a light-receiving body without being obstructed by the reflective body.

Furthermore, the present invention is the contactless connector, wherein the rotation-side light element and the fixed-side light element are formed at an optical fiber light output end when functioning as light-emitting elements, the rotation-side light element and fixed-side light element are formed at an optical fiber light input end when functioning as light-receiving elements, and a light path is formed between the optical fiber light output end and the optical fiber light input end via the reflective body. As a result, multiple channel high-speed data can be sent and received contactlessly, for example.

The contactless connector of the present invention is constituted comprising a reflective body in the rotational axis position of the rotating body, wherein a light path is always formed via the reflective body between a light-emitting body or light-receiving body constituting a rotation-side light element of the rotating body and a light-receiving body or light-emitting body constituting a fixed-side light element of a fixed body opposite the rotating body. Therefore, a contactless connector for which high-speed communication continuity is secured can be provided.

BRIEF DESCRIPTION OF THE DRAWINGS

FIG. 2 shows a light path that is formed between a rotation-side light element and a fixed-side light element;

FIG. 9 serves to illustrate an example where the constitution of the connector function is put to use as a switch function;

DESCRIPTION OF THE PREFERRED EMBODIMENTS

Preferred embodiments for implementing the present invention will be described hereinbelow with reference to the drawings. When the procedure of the description is mentioned, a light-emitting body is first described as a light-emitting element and a light-receiving body is described as a light-receiving element. Further, finally, the light-emitting element and light-receiving element can extend a light-output end and light-input end of a optic fiber.

Figure 1:
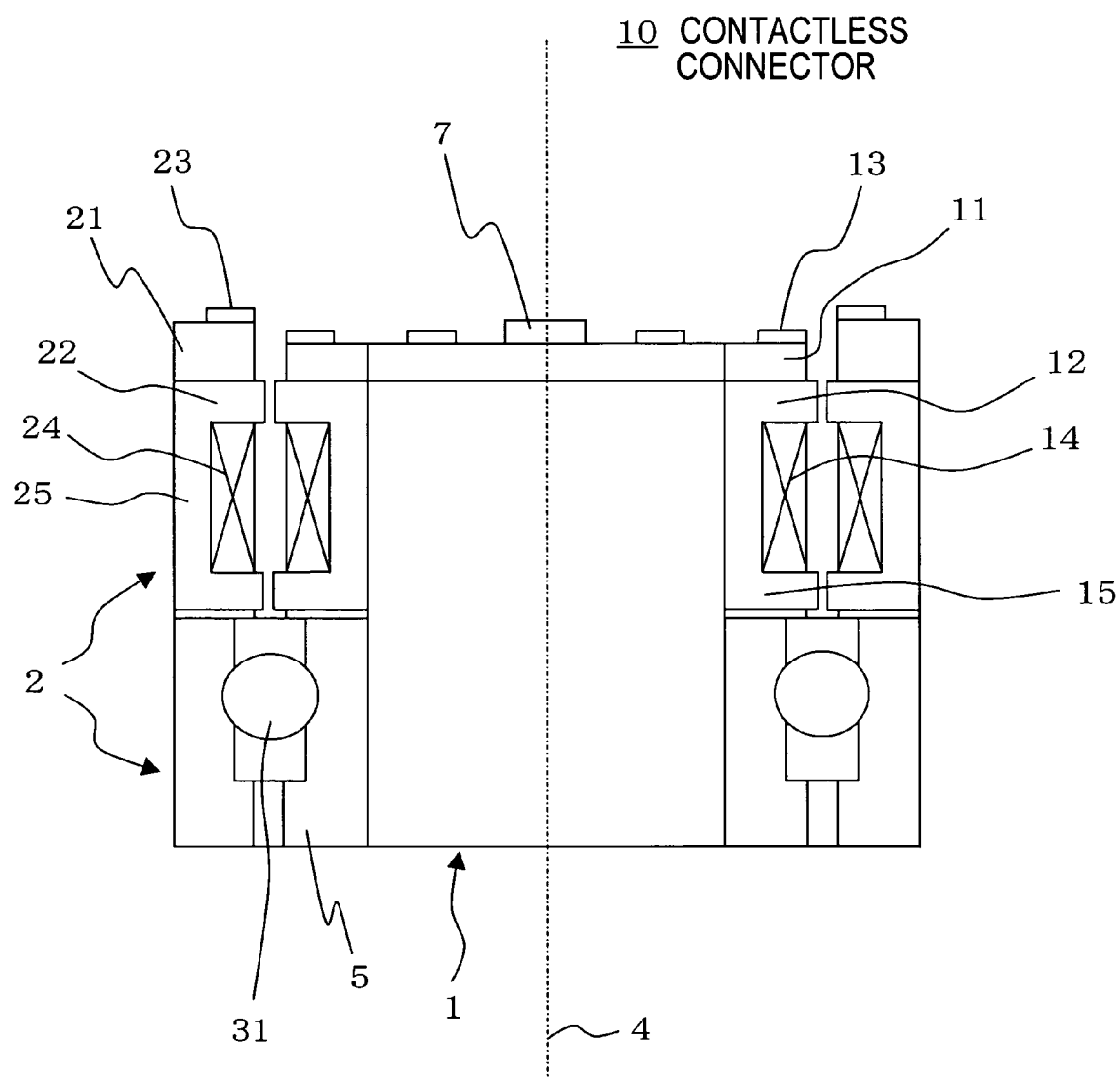
FIG. 1 shows a cross-sectional view of a contactless connector to which the present invention is applied.

FIG. 1 shows an example of a contactless connector 10 to which the present invention is applied. A cross-sectional view in a plane that includes a rotational axis 4 is shown. The contactless connector 10 according to the present invention is largely constituted, as shown in FIG. 1, by a rotating body 1 and fixed body 2. The rotating body 1 is constituted to be capable of rotation about the rotational axis 4. Further, the fixed body 2 is provided and fixed to the periphery of the rotating body 1.

The rotating body 1 is constituted by a rotation-side electric circuit portion 11, a rotation-side holding portion 12, a rotation-side light element 13, a rotation-side transformer winding 14, a rotation-side transformer core 15, and a reflective body 7.

The rotation-side electric circuit portion 11 is provided at the top of the rotating body 1 and performs various data processing. For example, when an imaging camera is attached to the rotating body 1, a video signal or the like from the camera, which is an external device, is inputted to the rotation-side electric circuit portion 11 and an electrical signal that causes the rotation-side light element 13 to emit light is outputted. The rotation-side electric circuit portion 11 is electrically connected to the rotation-side light element 13, and data produced as a result of light being received by the rotation-side light element 13 is processed and outputted to an external device that is connected to the rotating body 1. Further, when a detection portion that detects the rotational speed or rotational angle of the rotating body 1 is on the side of the rotating body 1, the detection portion contains a computing portion that calculates the rotational speed or the rotational angle for driving the reflective body 7 to form a light path from any element of the rotation-side light element 13 to any element of a fixed-side light element 23 by using detected data.

The rotation-side holding portion 12 is located at the bottom of the rotation-side electric circuit portion 11 and holds the rotation-side electric circuit portion 11.

The rotation-side light element 13 is located on the disk-shaped face of the rotating body 1 that lies orthogonal to the rotational axis 4. The rotation-side light element 13 transmits data to the fixed-side light element 23 contactlessly via the reflective body 7 by emitting light on the basis of the electric signal form the rotation-side electric circuit portion 11. Further, conversely, the rotation-side light element 13 receives data from the fixed-side light element 23 via the reflective body 7 and outputs the data to the rotation-side electric circuit portion 11.

The rotation-side transformer winding 14 is located in a recess on the outer perimeter of the rotating body 1 at the bottom of the rotation-side holding portion 12. Power from the fixed body 2 is supplied as a result of the action of magnetic induction and power can be supplied to each part of the rotating body 1 by means of the rotation-side transformer winding 14.

The rotation-side transformer core 15 is formed with a C-shaped cross-section to surround the rotation-side transformer winding 14. That is, the rotation-side transformer core 15 houses the rotation-side transformer winding 14 in the C-shaped recess of the rotation-side transformer core 15 and a rotating transformer is formed between the rotation-side transformer core 15 and the fixed body 2. Further, the rotation-side holding portion 12 mentioned earlier is a portion of the rotation-side transformer core 15.

The reflective body 7 is constituted so as to be capable of rotating about the axis of rotation 4 and has a structure in which a planar mirror is vertically installed at the tip of an arm of a predetermined length d that is attached at a right angle to the axis of rotation 4. The reflective body 7 reflects light emitted from the rotation-side light element 13 and fixed-side light element 23. Therefore, the reflective body 7 is constituted by an element having a reflective face of high reflectance on the upper face and rear face of the element.

Further, a reflective body driving portion that drives the reflective body 7 is included in the reflective body 7 in FIG. 1 and, although the reflective body driving portion is shown in a state of being installed on the side of the rotating body 1, this reflective body driving portion can also be installed on the side of the fixed body 2.

The fixed body 2 will be described next. As shown in FIG. 1, the fixed body 2 is constituted by a fixed-side electrical circuit portion 21, a fixed-side holding portion 22, the fixed-side light element 23, a fixed-side transformer winding 24, and a fixed-side transformer core 25.

The fixed-side electrical circuit portion 21 is provided at the top of the disk of the fixed body 2. The fixed-side electrical circuit portion 21 is electrically connected to the fixed-side light element 23 and data produced as a result of receiving light by means of the fixed-side light element 23 is processed and outputted to an external device that is connected to the fixed body 2. Further, during two-way communications between the rotation-side light element 13 and fixed-side light element 23, the fixed-side electrical circuit portion 21 outputs data inputted from the external device to the fixed-side light element 23. In addition, when a detection portion that detects the rotational speed or rotational angle of the rotating body 1 is on the side of the fixed body 2, the detection portion contains a computing portion that calculates the rotational speed or the rotational angle for driving the reflective body 7 to form a light path from any element of the rotation-side light element 13 to any element of the fixed-side light element 23 by using data that is detected by the detection portion.

The fixed-side holding portion 22 is located below the fixed-side electrical circuit portion 21 and holds the fixed-side electrical circuit portion 21.

The fixed-side light element 23 is located on a planar disk of the fixed body 2 that is substantially parallel to the disk face of the rotating body 1 where the rotation-side light element 13 is disposed. The fixed-side light element 23 receives light emitted from the rotation-side light element 13 contactlessly via the reflective body 7 and outputs the data produced as a result of receiving the light to the fixed-side electrical circuit portion 21. Further, the fixed-side light element 23 emits light on the basis of the data from the fixed-side electrical circuit portion 21 and transmits data to the rotation-side light element 13 via the reflective body 7. A light path is formed in the direction that is substantially orthogonal to the axis of rotation 4 between the fixed-side light element 23 and the rotation-side light element 13 as shown in FIG. 1.

The fixed-side transformer winding 24 is located within the fixed body 2 in a position opposite the rotation-side transformer winding 14. The fixed-side transformer winding 24 supplies power from the external device connected to the fixed body 2.

The fixed-side transformer core 25 has a cross-section that is formed in a C shape to surround the fixed-side transformer winding 24. The fixed-side transformer core 25 houses the fixed-side transformer winding 24 in the recess of the fixed-side transformer core 25 and a rotating transformer is formed between the fixed-side transformer core 25 and the rotating body 1. Further, the fixed-side holding portion 22 is a portion of the fixed-side transformer core 25.

In addition, the contactless connector 10 comprises a rolling element 31 that serves to render the rotating action of the rotating body 1 smooth and to align the rotating body 1 with fixed body 2 and so forth. The rolling element 31 is located in a gap between the rotating body 1 and fixed body 2. The rotating body 1 and fixed body 2 comprise an inner wheel and outer wheel respectively that serve to render the rotating action of the rolling element 31 smooth. A bearing 5 is constituted by the rolling element 31 and the inner and outer wheels.

When it is not necessary to render the rotating action of the rotating body 1 smooth and perform the alignment, and so forth, the rolling element 31 can be omitted.

A light path formed between the rotation-side light element 13 and fixed-side light element 23 will be described next. FIG. 2 shows an example of the light path and is a top view of this contactless connector 10.

In the description hereinbelow, it is established that the rotation-side light element 13 is a light-emitting element and the fixed-side light element 23 is a light-receiving element. As described subsequently, a constitution in which the rotation-side light element 13 is conversely a light-receiving element and the fixed-side light element 23 is a light-emitting element is also possible.

The reflective body 7 is a structure in which a planar mirror is vertically installed at the tip of an arm of a predetermined length d that is attached at a right angle to the axis of rotation 4 as mentioned earlier. However, in order to indicate the basic functions of the reflective body 7, a case where d=0, that is, where there is no arm to which the reflective mirror is attached will be described first.

A case where d≠0, that is, where there is an arm to which the reflective mirror is attached will be described next by way of comparison with the armless case.

First, as shown in FIG. 2, a case where the rotation-side light element 13 and fixed-side light element 23 are located on a straight line oriented the rotational center O, and when the planar part of the reflective body 7 is on the line segment CE, the position in FIG. 2 is the initial position of the rotating body 1 and reflective body 7.

In this position, when the rotation-side light-emitting element 13 emits light toward the reflective body 7, the light is reflected by the reflective body 7 and travels toward the fixed-side light element 23. However, the light path of the reflected light is obstructed by the rotation-side light element 13. This is because the incident light and reflected light have the same route.

Figure 3A:
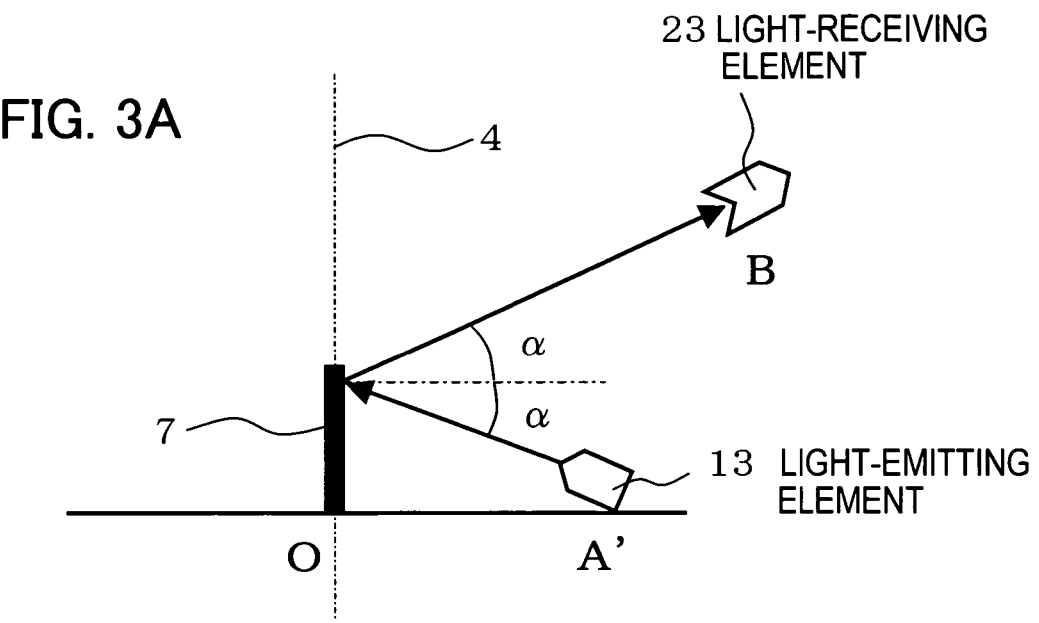
FIGS. 3A and 3B serve to illustrate a light path that is formed by a reflective body.

Therefore, as shown in FIG. 3A, the fixed-side light element 23 is installed in a higher position than the rotation-side light element 13. Further, FIG. 3 is a side view of the contactless connector 10 as per FIG. 1. Further, the rotation-side light element 13 is provided at an attachment angle α to the bottom face of the rotating body 1 so that light can be received by means of the fixed-side light element 23 at a different placement height. As a result, the light path is not obstructed and the light reflected by the reflective body 7 is transmitted over the top of the rotation-side light element 13 so that the light can be received by the fixed-side light element 23.

That is, the light path is constituted from the light-emitting element 13 at initial position A' to the light-receiving element 23 at the fixed position B.

Figure 4:
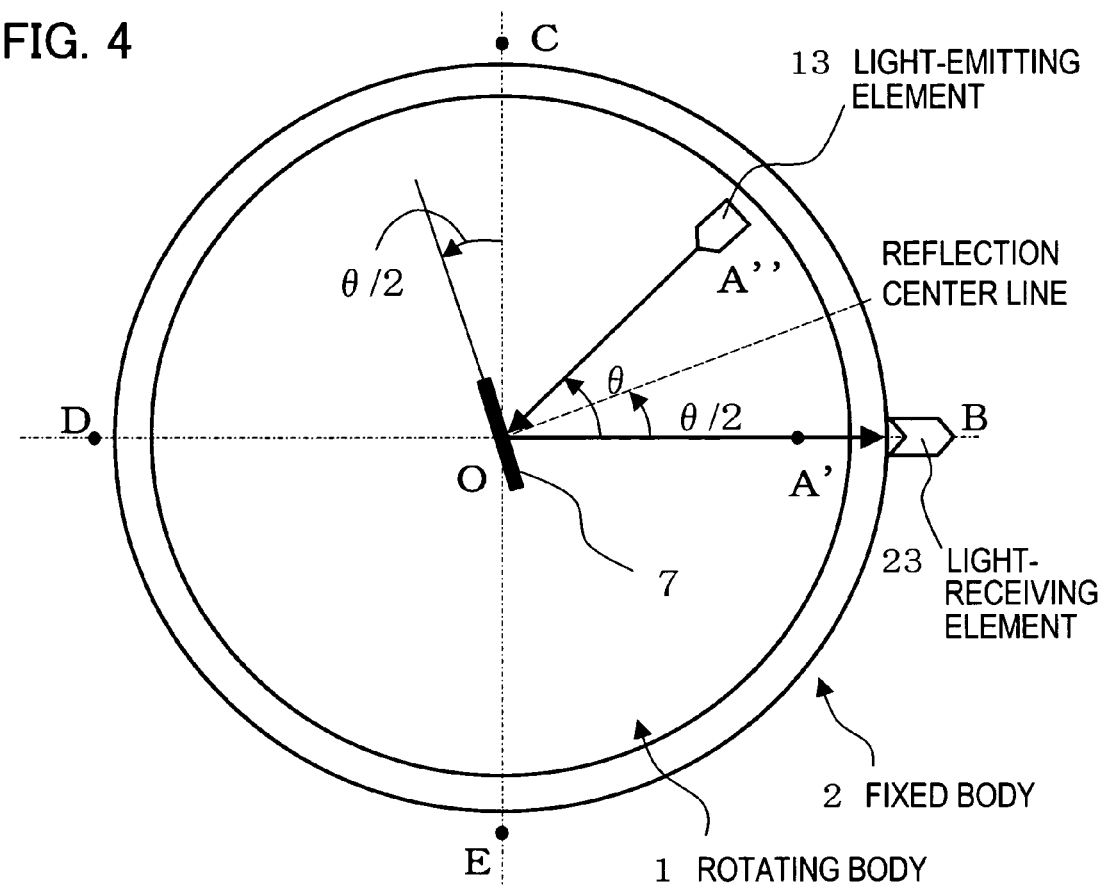
FIG. 4 serves to illustrate a light path that is formed by a reflective body.

Next, as shown in FIG. 4, a case where the rotating body 1 rotates from the initial position through the rotation angle θ will be considered. In this case, the rotation-side light element 13 moves from position A' to position A".

Generally, when incident light is reflected by a reflective face such as a mirror, the angle formed by a reflection center line orthogonal to the reflective face and the incident light (known as the angle of incidence), and the angle formed by the reflection center line and reflected light (known as the reflection angle), are equal. In the example shown in FIG. 4, the angle formed by the incident light from the light-emitting element 13 and reflection center line (incident angle, θ/2) is equal to the angle formed by the reflection center line and reflected light (reflection angle, θ/2).

Meanwhile, the reflection center line rotates about the rotation center O in accordance with the movement of the rotation-side light element 13. If the reflective face of the reflective body 7 is rotated along the rotating reflection center line, the angle of incidence and reflection angle is θ/2. Therefore, the light that is emitted from the rotation-side light element 13 is reflected by the reflective body 7 and always travels toward the specified fixed-side light element 23.

Therefore, if the rotation speed (or rotation angle) of the reflective body 7 is half the rotation speed (or rotation angle) of the rotating body 1, the light emitted from the rotation-side light element 13 is always able to travel toward the specified fixed-side light element 23.

That is, the rotation-side light element 13 and fixed-side light element 23 are provided so that the light path is formed between the light-emitting element 13 and light-receiving element 23 via the reflective body 7 when the light emitted from the rotation-side light element 13 is reflected by the reflective body 7 and the fixed-side light element 23 is located on the light path line segment. Further, subsequently, if the rotation speed of the reflective body 7 is half the rotation speed of the rotating body 1, because the reflective face of the reflective body 7 rotates about the axis of rotation 4, irrespective of which position the rotation-side light element 13 is located in accordance with the rotation of the rotating body 1, the light path is always formed between the rotation-side light element 13 and the fixed-side light element 23 in a specified position.

To describe this in the case of FIG. 4, when the rotation-side light element 13 is located in position A" due to the rotation of the rotating body 1, the reflection center line is located at θ/2 and, therefore, the light emitted from the rotation-side light element 13 is reflected by the reflective body 7 and can be received by the fixed-side light element 23. That is, the light path is constituted from the light-emitting element A" when the rotating body 1 has rotated through θ to the light-receiving element 23 in fixed position B.

Further, when the rotating body 1 is rotated through 90° (θ=90°), the rotation-side light element 13 is located on the line segment CO. Here, if the reflective body 7 is rotated through 45°, the reflection center line is located at 45° and, therefore, the light reflected by the reflective body 7 from the light-emitting element 13 also constitutes a light path to the light-receiving element 23 at fixed position B.

Figure 5:
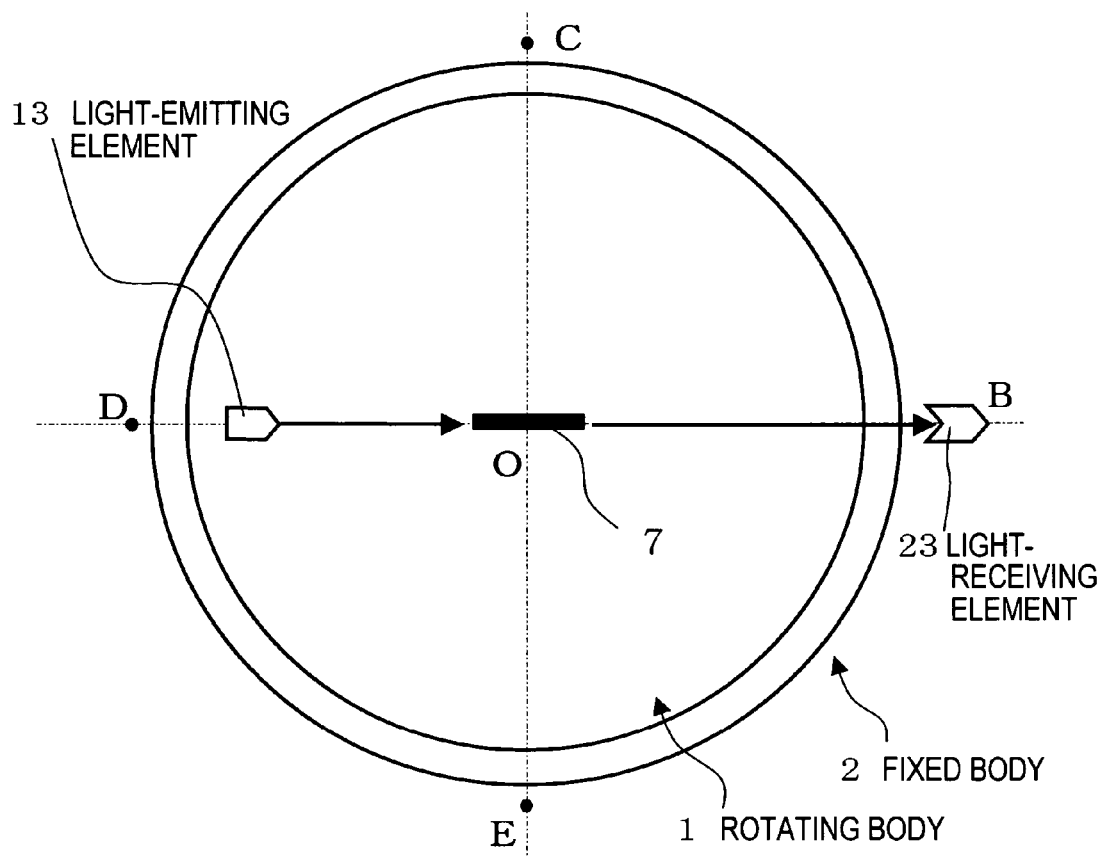
FIG. 5 serves to illustrate a light path that is formed by a reflective body.

Next, a case where the rotating body 1 is rotated 180° (θ=180°) as shown in FIG. 5 is considered. The reflection center line is located on the line segment CO (θ/2=90°) and the light path from the rotation-side light element 13 passes through the reflective body 7 and travels toward the fixed-side light-receiving element 23 at position B.

Figure 3B:
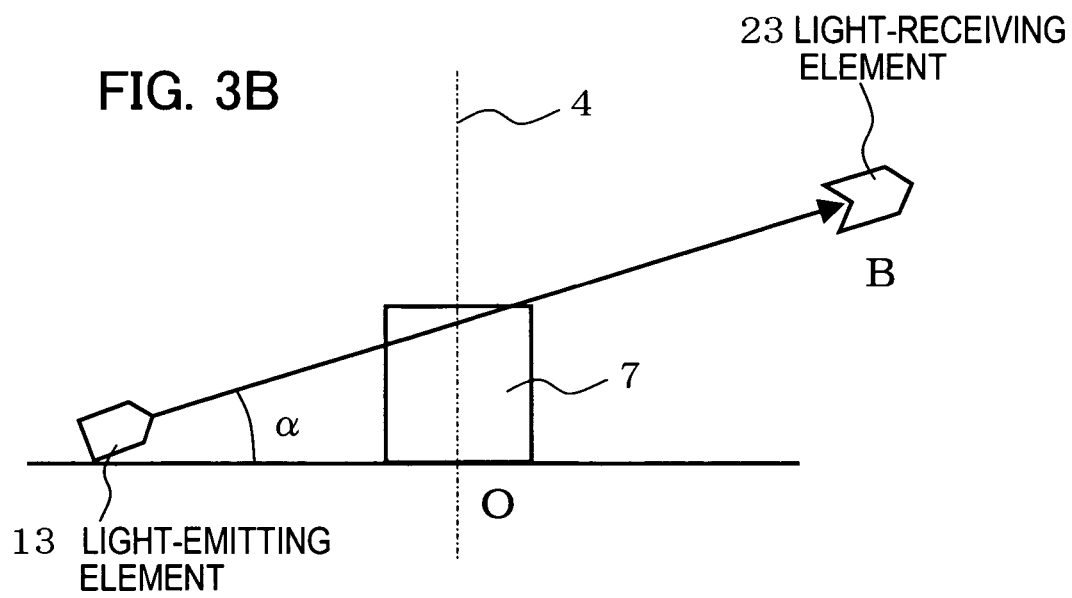

In this case, the reflective face of the reflective body 7 and the light path from the light-emitting element 13 are parallel. Therefore, the light is not reflected by the reflective body 7 and, as shown in FIG. 3B, the emitted pencil of light from the light-emitting element 13 travels directly toward the light-receiving element 23. However, there is a risk that the light path will be obstructed when the reflective body 7 is thick. In this case, so that the light path is not obstructed, the pencil of light emitted from the light-emitting element 13 may not contact the reflective body 7.

Figure 6:
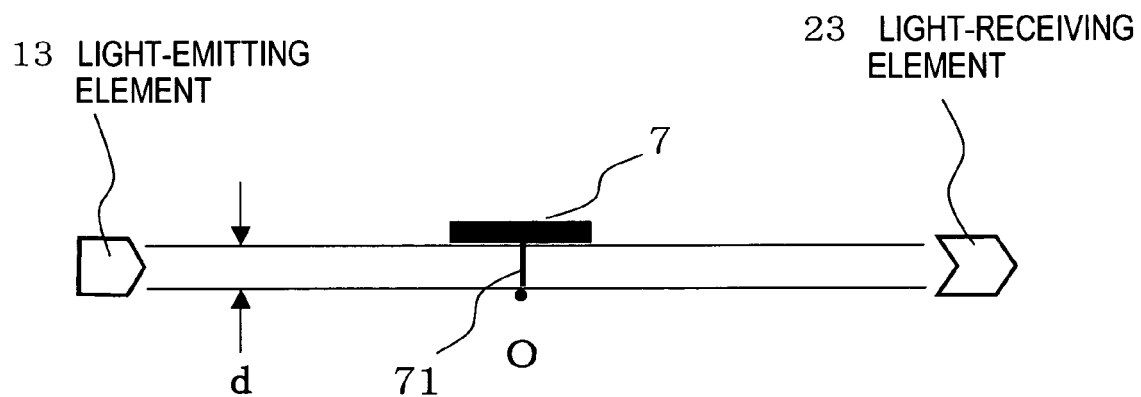
FIG. 6 shows an explanatory diagram for avoiding obstruction of the light path when the reflective body is thick.

That is, as shown in FIG. 6, when it is assumed that the pencil of light emitted from the light-emitting element 13 has a cylindrical shape with a radius d, if the reflective body 7 is installed spaced apart from the center O of the axis of rotation 4 through the diametric width d, the light path is not obstructed by the reflective body 7 even when θ=180° and the light from the light-emitting element 13 can be received by the light-receiving element 23.

Further, as detailed above, the reflective body 7 is installed shift through diametric width d from center O of the axis of rotation 4. Therefore, a light path in a case where d≠0, that is, where there is a reflective body support arm 71 (arm length=d) to which the reflective body 7 is attached will be considered hereinbelow.

Although detailed explanation is shown in FIG. 7, because the reflective body 7 is at a distance d from the center O of the axis of rotation 4, the conditions are different as a result of the rotation direction.

First, FIGS. 7A to 7D show a case where the rotating body 1 is rotated in the CCW (counterclockwise) direction from position θ=0°.

(i) A case where the rotation-side light-emitting body 13 is located such that θ=0° and the reflective body support arm rotation angle=0° (FIG. 7A) may be exactly the same approach as that of FIGS. 2 and 3A.

(ii) A case where the rotation-side light-emitting body 13 is located such that θ=90° and the reflective body support arm rotation angle=45° (FIG. 7B) may be exactly the same approach as that of FIG. 4 but the reflected light reflected by the reflective body 7 moves upward through d+β from the position of the fixed-side light-receiving element B. Here, β is approximately d/2.

(iii) A case where the rotation-side light-emitting body 13 is located such that θ=180° and the reflective body support arm rotation angle=90° (FIG. 7C) is the aspect shown in FIGS. 3B and 5 and naturally also the aspect illustrated in FIG. 6 is also established. That is, the reflective body 7 is at the distance d from the center O of the axis of rotation 4, whereby the emitted pencil of light directly enters the fixed-side light element 23 without being obstructed by the reflective body 7.

(iv) A case where the rotation-side light-emitting body 13 is located such that θ=270° and the reflective body support arm rotation angle=135° (FIG. 7D) is exactly the same approach as that of FIG. 4. However, the reflected light reflected by the reflective body 7 moves upward through d+β from position B of the fixed-side light-receiving element 23. Here, β is approximately d/2.

Figure 7A:
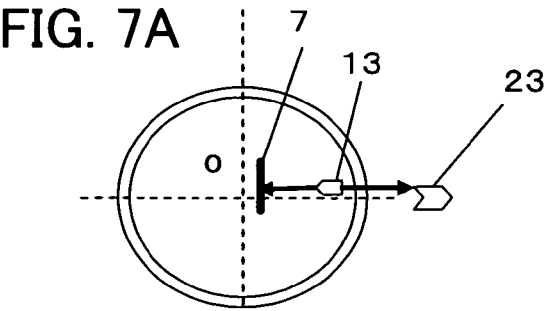
FIG. 7A to 7G serve to illustrate a state of the rotation direction when the reflective body is decentered from the center of the axis of rotation that is related to FIG. 6.
Figure 7B:
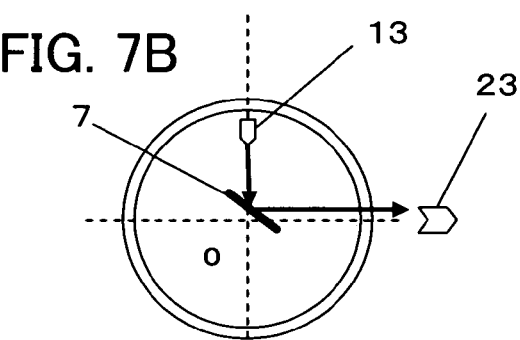
Figure 7C:
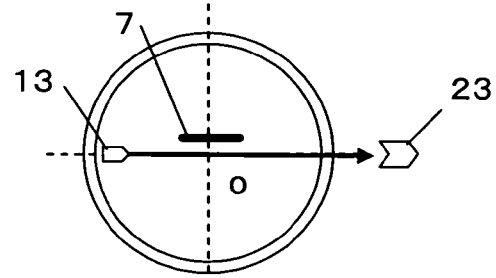
Figure 7D:
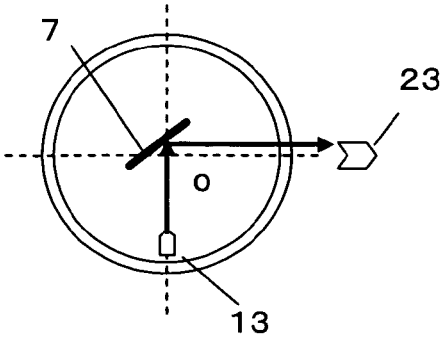
Figure 7E:
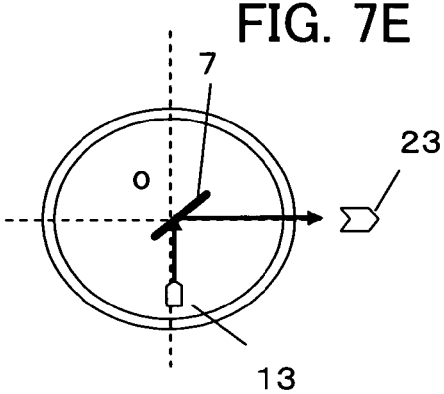
Figure 7F:
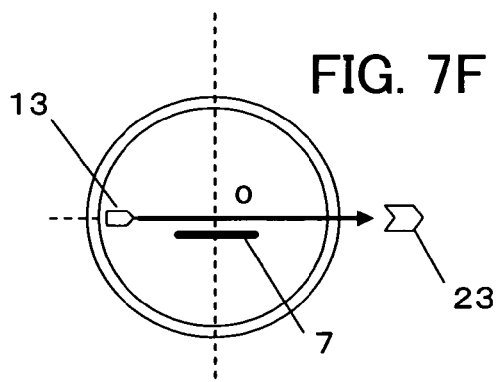
Figure 7G:
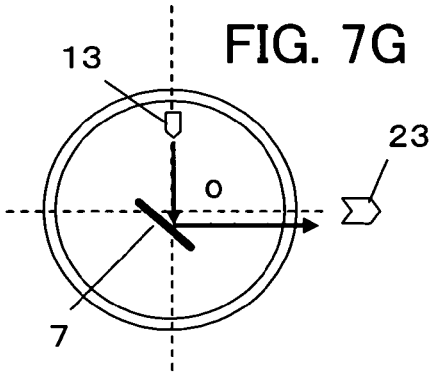

FIGS. 7E to 7G show a case where the rotating body 1 is rotated in the CW (clockwise) direction from position θ=0°.

(v) A case where the rotation-side light-emitting element 13 is located such that θ=−90° and the reflective body support arm rotation angle=−45° (FIG. 7E) is exactly the same approach as that of FIG. 7B in the CCW direction.

(vi) A case where the rotation-side light-emitting element 13 is located such that θ=−180° and the reflective body support arm rotation angle=−90° (FIG. 7E) is exactly the same approach as that of the CCW direction and, because the reflective body 7 is at the distance d from the center O of the axis of rotation 4, the pencil of light directly enters the fixed-side light element 23 without being obstructed by the reflective body 7.

(vii) A case where the rotation-side light-emitting body 13 is located such that θ=−270° and the reflective body support arm rotation angle=−135° (FIG. 7E) is exactly the same approach as that of the CCW direction but the reflected light reflected by the reflective mirror moves downward through d+β from the position of the fixed-side light-receiving element. Here, β is approximately d/2.

(viii) A case where the rotation-side light-emitting body 13 is located such that θ=−270° and the reflective body support arm rotation angle=−135° (FIG. 7E) is exactly the same approach as that of the CCW direction but the reflected light reflected by the reflective mirror moves downward through d+β from the position of the fixed-side light-receiving element. Here, β is approximately d/2.

(ix) A case where the rotation-side light-emitting body 13 is located such that θ=−270° and the reflective body support arm rotation angle=−135° (FIG. 7E) is exactly the same approach as that of the CCW direction but the reflected light reflected by the reflective mirror moves downward through d+β from the position of the fixed-side light-receiving element. Here, β is approximately d/2.

As mentioned earlier, supposing that the constitution is such that the reflective body 7 is installed spaced apart by the distance d from the center O of the axis of rotation 4, there is the possibility of the requirement for measures such as providing the light-emitting element 13 and light-receiving element 23 with an optical system with quite a large aperture and so forth. However, irrespective of which position the rotation-side light-emitting element 13 moves to in accordance with the rotation of the rotating body 1, the light path is always formed between the rotation-side light-emitting element 13 and the fixed-side light element 23 in a specified position. Accordingly, an unbroken light path between the rotation-side light-emitting element 13 and the fixed-side light element 23 is formed and the continuity of the communication is secured.

Further, it is exactly the same when the rotation-side light element 13 is the light-receiving element and the fixed-side light element 23 is the light-emitting element due to the reversibility of light.

Figure 8A:
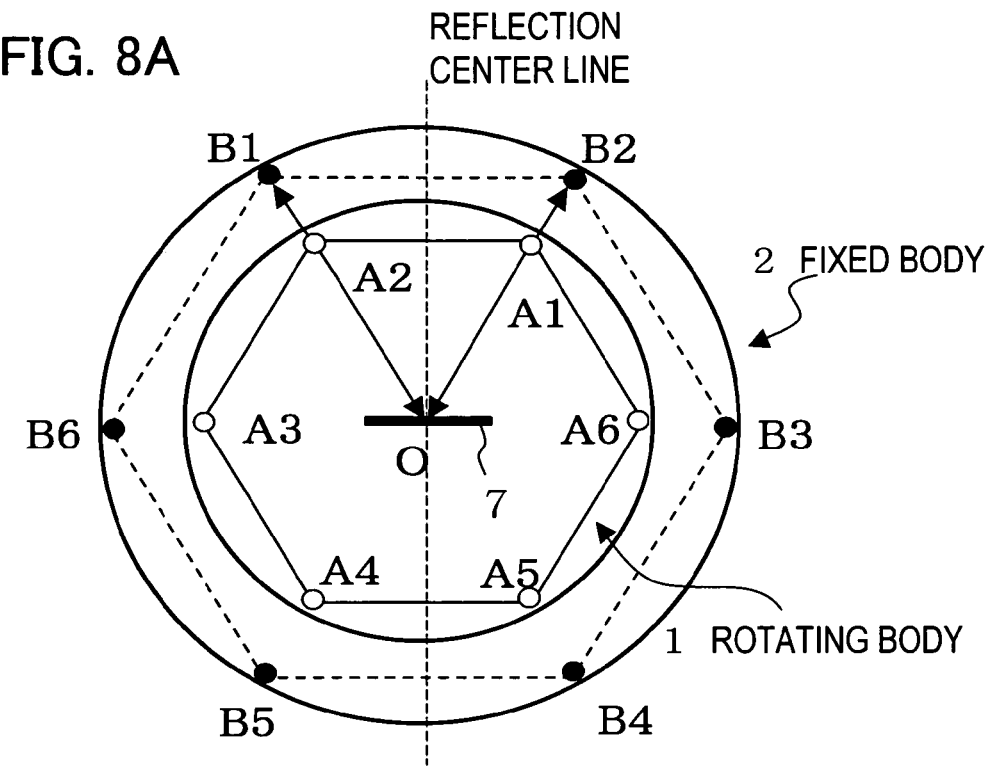
FIGS. 8A and 8B serve to illustrate a case where the rotating body is provided with a plurality of light-emitting elements and the fixed body is provided with a plurality of light-receiving elements to correspond with the plurality of light-emitting elements.
Figure 8B:
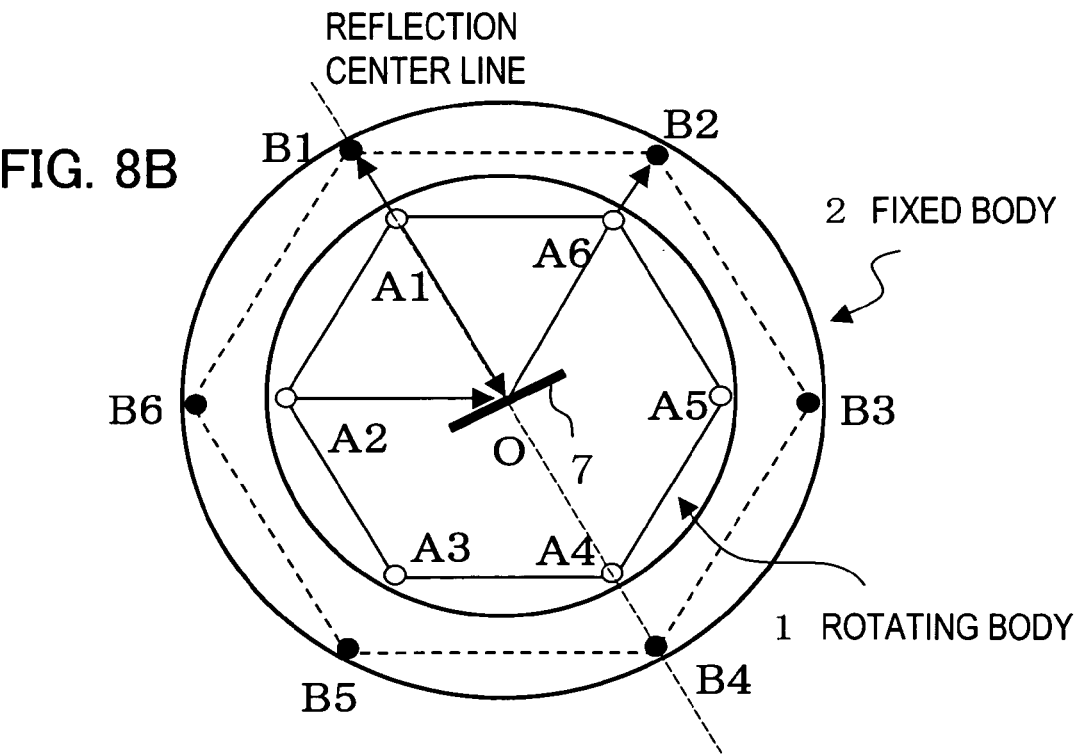

Next, a case where the rotating body 1 is provided with a plurality of light-emitting elements 13 and the fixed body 2 is provided with a plurality of light-receiving elements 23 such that the light-receiving elements 23 correspond with the light-emitting elements 13 will be described with reference to FIGS. 8A and 8B. The example shown in FIGS. 8A and 8B are an example where the rotation-side light-emitting element 13 and fixed-side light-receiving element 23 are located in the vertex positions of a regular hexagon. However, in order to simplify the drawings, a case where d=0, that is, where there is no arm to which the reflective body 7 is attached, is illustrated.

Even in this example with pluralities of light-emitting elements and light-receiving elements, when the light emitted by the rotation-side light-emitting element 13 is reflected by the reflective body 7 and the fixed-side light element 23 is located on the light path line segment, each rotation-side light-emitting element 13 and each fixed-side light element 23 are provided to form a light path via the reflective body 7 between the rotation-side light-emitting element 13 and fixed-side light element 23.

Consider the light path in the position in FIG. 8A. The reflective face of the reflective body 7 is located parallel to the line segment that links positions B3 and B6. In this case, the reflection center line is located vertically as shown in FIG. 8A. Therefore, the light that is emitted from position A1 of the rotation-side light-emitting element 13 is reflected by the reflective body 7 and travels toward the position B1 of the fixed-side light element 23.

Further, in order to simplify the description of FIGS. 8A and 8B below as far as possible, each of the rotation-side light-emitting elements 13 arranged at positions A1 to A6 are indicated by means of reference numerals for these positions. Likewise, each of the fixed-side light elements 23 arranged in positions B1 to B6 are indicated by means of reference numerals for the fixed-side positions B1 to B6.

The light path to the fixed-side light element 23 in position B1 (therefore shown as the 'fixed-side light-receiving element B1') is obstructed by the rotation-side light-emitting element 13 (therefore shown as the 'rotation-side light-emitting element A2') in position A2. However, because the rotation-side light-emitting element A2 is established at the attachment angle α to the bottom face of the rotating body 1 as shown in FIG. 3A, the light path passes over the rotation-side light-emitting element A2 and travels toward the fixed-side light-receiving element B1.

Further, the light path is formed between the rotation-side light-emitting element A2 and the corresponding fixed-side light-receiving element B2.

In addition, as illustrated by FIG. 6, because the reflective body 7 is also provided at the distance d from the center O of the axis of rotation where the light path is not obstructed, the light path is formed traveled toward the fixed-side light-receiving element B3. The reflective body 7 has a reflective face formed on both sides thereof and, therefore, the other each light-emitting elements A4 to A6 are same.

Here, consider a case where the rotating body 1 is rotated 60° counterclockwise as shown in FIG. 8B. Each of the light-emitting elements A1 to A6 also rotates 60°. Thereupon, because the reflective body 7 has a rotation angle that is half that of the rotating body 1, the reflective body 7 rotates 30°. Therefore, the reflection center line is located as shown in FIG. 8B. The rotation-side light-emitting element A1 forms the light path traveled toward the fixed-side light-receiving element B1 and the rotation-side light-emitting element A2 forms the light path traveled toward the fixed-side light-receiving element B2. The other light-emitting elements A3 to A6 are also exactly the same because both sides of the reflective body 7 are reflective faces.

Even in a case where pluralities of the rotation-side light-emitting element 13 and fixed-side light element 23 are arranged thus, the light path can always be formed between the respective rotation-side light-emitting elements 13 and the respective corresponding fixed-side light-receiving elements 23. Therefore, even when pluralities of the rotation-side light element 13 and fixed-side light element 23 exist, unbroken light paths are formed between the respective elements 13 and 23 and communication continuity can be secured. Further, data can be sent and received on multiple channels of the contactless connector 10 of the present invention as a result of communications using the pluralities of light elements 13, 23.

Furthermore, although the respective elements 13, 23 are arranged at 60° intervals in order to simplify the description of the example shown in FIGS. 8A and 8B, the intervals are not limited to 60° intervals and any positions are possible. This is because, as long as the rotation speed of the reflective body 7 is half the rotation speed of the rotating body 1, the light path is always formed between the rotation-side light-emitting elements 13 and the corresponding fixed-side light elements 23.

Further, although the respective rotation-side light elements 13 are provided in positions in which the distance from the rotation center O is fixed in the example shown in FIGS. 8A and 8B, the distances may be those of any positions. In this case, each of the rotation-side light elements 13 maybe provided on the rotating body 1 by establishing the attachment angle α in each case so that the light path is formed to the corresponding fixed-side light elements 23.

In addition, although the rotation-side light element 13 is the light-emitting element and the fixed-side light element 23 is the light-receiving element in the example shown in FIGS. 8A and 8B, a light path is formed in exactly the same way even if the rotation-side light element 13 is the light-receiving element and the fixed-side light element 23 is the light-emitting element due to the reversibility of light. As a result, the contactless connector 10 of the present invention is able to send and receive bidirectional data simultaneously.

In addition, the same is also true for a mixed arrangement in which some of the plurality of rotation-side light elements 13 are light-emitting elements and the remainder are light-receiving elements. For example, the mixed arrangement may be such that the fixed-side light element B1 is a light-receiving element and the light element B2 is a light-emitting element, if the rotation-side light element Al is a light-emitting element and the light element A2 is a light-receiving element.

In order to make the rotation speed or rotation angle of the reflective body 7 half that of the rotating body 1, apart from a planetary gear train or the like, for example, this can be implemented by providing a reflective body driver device such as a motor that drives the reflective body 7 and a detection device that detects the rotation speed or rotation angle of the rotating body 1 and then effecting feedback control of the reflective body driver device to halve the rotation speed or rotation angle of the reflective body 7 on the basis of the detection result of the detection device.

The initial angle position of the reflective body 7 in a case where the reflective body driver device such as a motor is applied will now be described. When the reflective body driver device is applied, it is sometimes necessary to set the initial position of the reflective body 7 when a braking mechanism or the like is not provided. In this case, for example, when the initial angle position of the detection device for detecting the rotation angle of the rotating body 1 is when the rotation-body light-emitting element 13 and fixed-side light-receiving element 23 are located on a straight line facing the rotation center O of the reflective body 7, settings may be made by applying feedback control to the reflective body driver device by inputting half the rotation angle at that time to establish the initial angle position of the reflective body 7.

By providing the reflective body 7 as detailed above, the contactless connector can be constituted to always optically connect the light element on the rotating body 1 and the light element on the fixed body 2.

On the other hand, the constitution of this connector function can be put to another use as a switch function for switching the light path from the light element on the rotating body 1 to the light element on the fixed body 2.

Although this is described on the basis of FIG. 9, the base state is the state in FIG. 4.

That is, FIG. 4 shows a state where the light-emitting element in position A" and the light-receiving element in position B are connected by causing the reflective body 7 to rotate through θ/2 because the rotating body 1 is rotated through θ from the reference position.

Meanwhile, in the example shown in FIG. 9, a case of switching from the light-emitting element 13 in position A" to the light-receiving element 23 in position F (a position spaced apart from position B by angle γ) is considered.

Clearly, in this case, because the light-receiving element 23 is rotated through γ from position B, if the reflective body 7 is also rotated through γ/2 (a total of θ/2+γ/2), the switch from the light-receiving element 23 in position B to the light-receiving element 23 in position F is effected.

Further, if the reflection center line is considered as a reference, although the reflection center line=θ/2 in the position of FIG. 4, because the reflection center line=θ/2+γ/2 in the position of FIG. 9, by rotating the reflective body 7 through θ/2+γ/2, another approach in switching from the light-receiving element 23 in position B to the light-receiving element 23 in position F is also possible.

The state in FIG. 4 was considered as the basis above but the validity of the state will be considered next.

When the line segment linking the rotation-side light element 13 and the rotation center O and the line segment linking the fixed-side light element 23 and rotation center O are positioned at the angle θ, the initial position of the reflective body 7 is determined so that the reflected light from the reflective body 7 travels toward the fixed-side light element 23 and, if the initial position is outputted from the computing portion that is contained in the rotation-side electric circuit portion 11 or fixed-side electrical circuit portion 21 and the reflective body 7 is rotated by the reflective body driver device, a state where the initial light path is connected results. Therefore, the position in FIG. 4 can be established as the reference position.

Further, although the case where the rotating body 1 is rotated was considered above, a case where the rotating body 1 also stands still will be considered here.

However, in this case, θ in the earlier relational expression may be considered to be the angle of installation of the rotation-side light element 13 on the rotating body 1 rather than the rotation angle of the rotating body 1 and the relational expression can be applied as is. That is, the case where the rotating body 1 stands still can also be handled in exactly the same way.

Here, the connector function and switch function are considered.

Here also, although the base function is the state in FIG. 4, the only difference is that the switch function switches from the light-receiving element B to the light-receiving element F and the connector function switches from the light-receiving element F to the light-receiving element B.

Further, whether the light-receiving element 23 is in position F or position B is determined by the computing portion contained in the rotation-side electric circuit portion 11 or fixed-side electrical circuit portion 21.

That is, in the case of a rotation-type contactless connector that employs the reflective body 7, the differences of the connector function and the switch function lie only with the similarities and differences of the connection-destination light-receiving element. Accordingly, the same contactless connector is able to possess (share) the two functions at the same time.

Therefore, it may also be said that the switch function that employs the reflective body 7 is an extension of the connector function that employs the reflective body 7.

Figure 10:
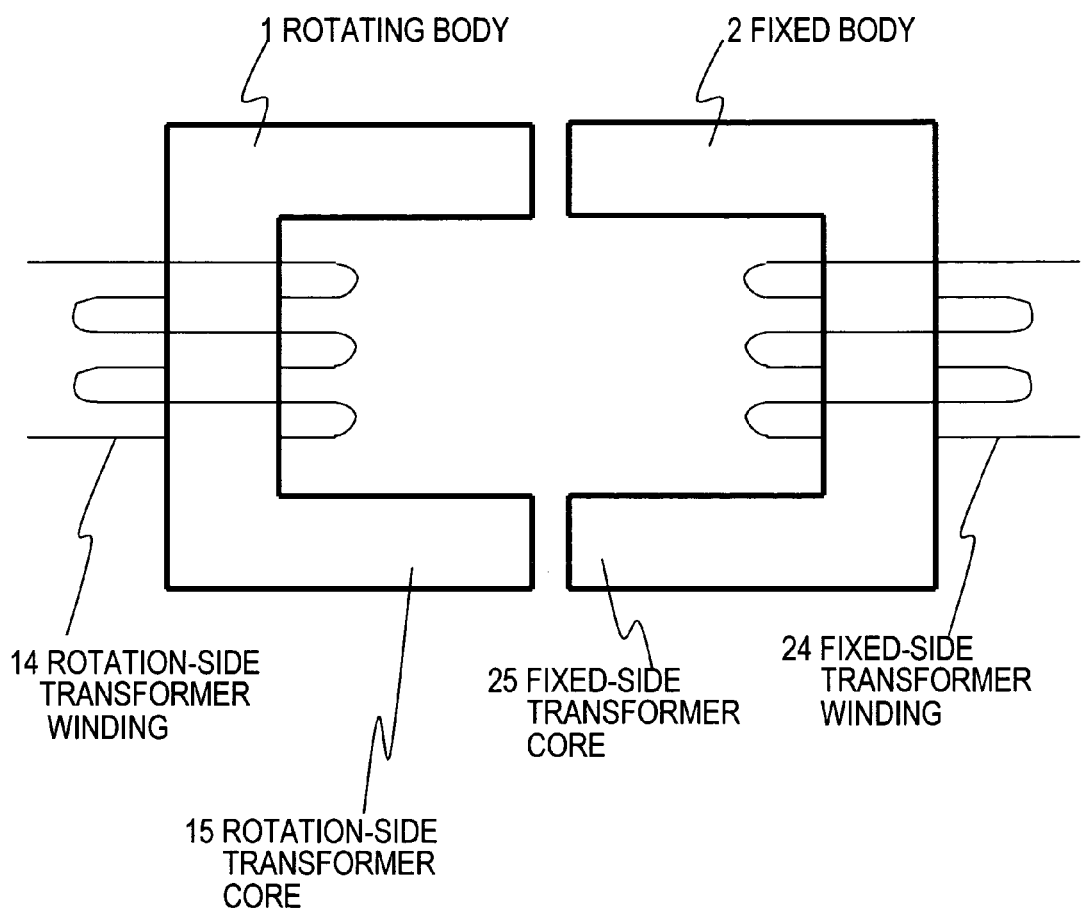
FIG. 10 serves to illustrate a contactless supply of power.

The contactless power supply from the fixed body 2 to the rotating body 1 will be described next by using FIG. 10. As mentioned earlier, the rotation-side transformer winding 14 is wound around the body part of the rotation-side transformer core 15 of the rotating body 1 and the fixed-side transformer wiring 24 is wound around the body part of the fixed-side transformer core 25 of the fixed body 2. In this state, a magnetic field is produced in the periphery of the fixed-side transformer core 25 as a result of a supply current from the main body device flowing to the fixed-side transformer wiring 24. As a result of the rotating action of the rotating body 1, a magnetic circuit is constituted when the rotation-side transformer core 15 is located in a position opposite the fixed-side transformer core 25 in which a magnetic field is produced. An electric current is produced in the rotation-side transformer winding 14 that is wound on the body part (the so-called law of magnetic induction). Therefore, power is supplied to each part of the rotating body 1, the rotation-side electric circuit portion 11, for example, is driven, and the rotation-side light element 13 emits light.

The blind mating function of the contactless connector 10 according to the present invention will be described next. The blind mating function is a function that makes it possible to use the contactless connector 10 irrespective of the position in the rotation direction of the rotating body 1 as long as the rotating body 1 is inserted in and mates with the fixed body 2 when the contactless connector 10 of the present invention is assembled.

Further, in the case of the contactless connector 10 with the blind mating function, because alignment of the rotating body 1 is not required, the bearing 5 comprising the rolling element 31 can be omitted.

For example, suppose that the rotating body 1 engages in the position shown in FIG. 4 after the rotating body 1 has mated with the fixed body 2. If the position of the reflective body 7 is determined so that the reflected light from the reflective body 7 travels toward the fixed-side light element 23 when the rotation-side light element 13 and fixed-side light element 23 are located on a straight line toward the rotation center O at the design stage and so forth, the position after mating can be considered as being the same as the position following rotation of the rotating body 1.

That is, the location of the rotating body 1 in the position shown in FIG. 4 after mating and the location of the rotating body 1 in the position shown in FIG. 4 as a result of rotation are the same. Accordingly, because the light path is always formed with the fixed-side light element 23 irrespective of the mating position in the rotation direction of the rotating body 1, the contactless connector 10 of the present invention can be used and the blind mating function can be implemented.

Next, the details of the data processing function of the rotation-side electric circuit portion 11 and fixed side electrical circuit portion 21 will be described by using FIG. 11. In this example, one channel's worth of data is sent and received between each of the rotation-side light elements 133 to 136 and each of the corresponding fixed-side light elements 233 to 236 in an example of a case where four-channel data (CH.1 to CH.4 respectively) are sent and received.

The rotation-side electric circuit portion 11 comprises interface (I/F) circuits 111 to 114 for processing the data of each channel and driver circuits 115 to 118. The data from the main body device is inputted to the I/F circuits 111 to 114 and converted into data that can be processed in the rotation-side electric circuit portion 11. The data is then converted into drive data by the driver circuits 115 to 118 and light is emitted from the respective rotation-side light elements 133 to 136 on the basis of the drive data.

The fixed-side electrical circuit portion 21 is constituted by receiver circuits 2111 to 2114, a switching circuit 2120, and I/F circuits 2121 to 2124. Data produced as a result of light being received by predetermined fixed-side light elements 233 to 236 is converted to data that can be processed in the fixed-side electrical circuit 21 by the receiver circuits 2111 to 2114 before being outputted to the switching circuit 2120. The switching circuit 2120 performs switching to output the received data of each channel to a predetermined output stage. As a result, for example, data of the first channel is outputted from I/F circuit 2122, data of the second channel is outputted from I/F circuit 2123, and so forth, whereby data can be outputted from the output stage desired by the user. Further, the switching circuit 2120 can also switch to the desired output stage by being inputted a switching control signal SWS from outside (the so-called 'multiplexer function').

In addition, as shown in FIGS. 12A to 12D, an identification code is added to the data of each channel by means of processing on the main body device side, and the switch circuit 2120 identifies the channel by using the identification code and switch data of each channel. For example, when the identification number code '00' is judged, the data of channel '1' is outputted from the I/F circuit 2124 and so forth.

Such channel identification encoding may be performed by a data processing circuit of the main body device connected to the fixed body 2 or may be performed by the driver circuit 115 to 118 of the rotation-side electric circuit portion 11. Further, identification of each channel maybe performed by adding a channel identification code to any of a plurality of channels (to establish a dedicated line) rather than adding a channel identification code to all data of all the channels.

Thus, by adding an identification code to the respective data, multiple channel data can be received by the fixed body 2, data of any channel can be identified and outputted to a predetermined output stage, and an automatic channel switching function can be implemented by the contactless connector 10.

Figure 11:
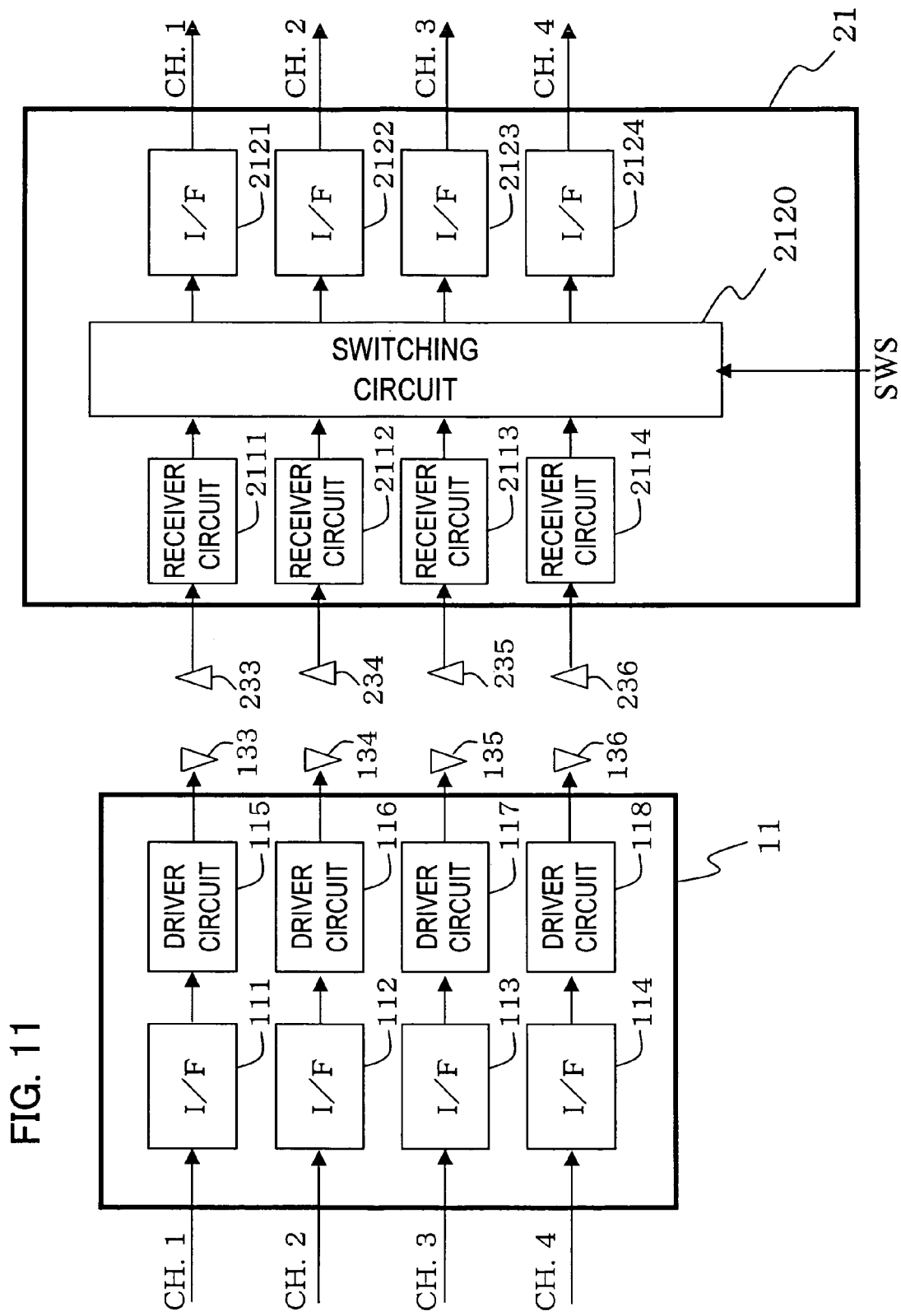
FIG. 11 shows the constitution of the rotation-side electrical circuit portion and the fixed-side electrical circuit portion.
Figure 12:
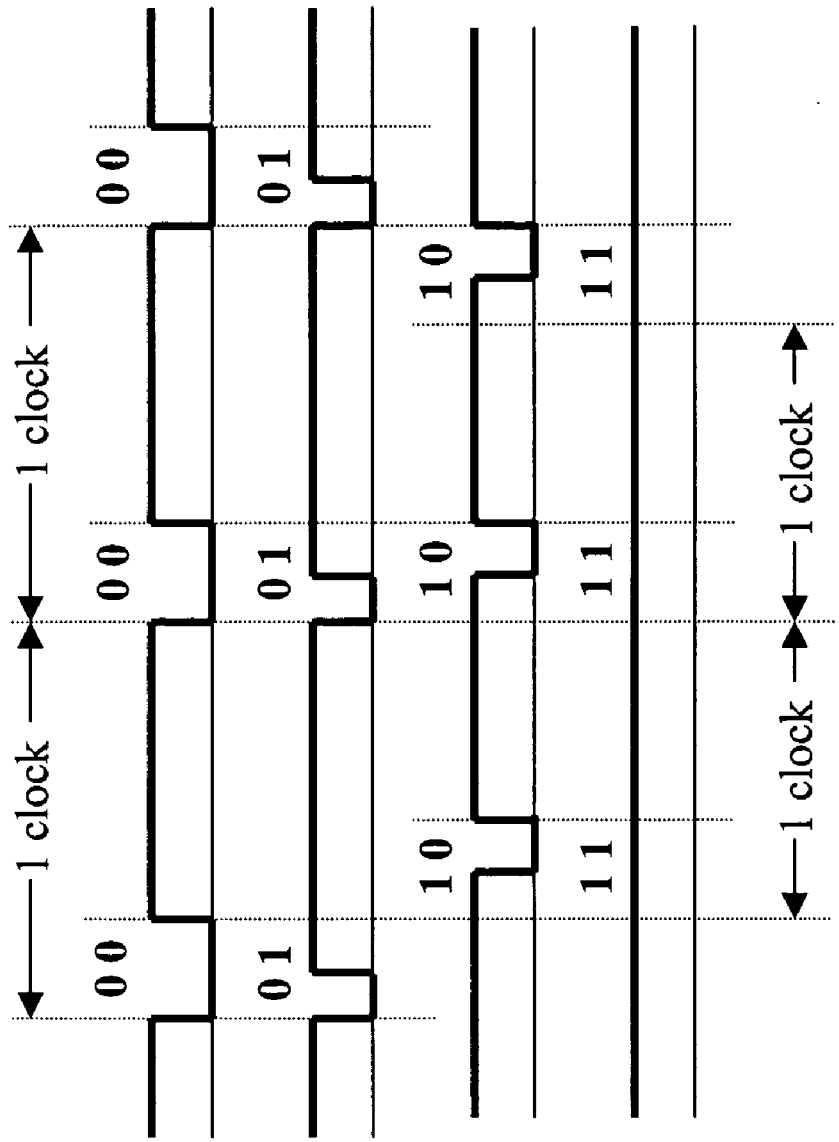
FIG. 12A to 12D show an example of data to which a channel identification code has been added.

The example shown in FIG. 11 shows the constitution of the each of the electrical circuit portions 11, 21 when the rotation-side light elements 133 to 136 are light-emitting elements and the fixed-side light elements 233 to 236 are light-receiving elements. In addition, the rotation-side light-emitting elements 133 to 136 may also be light-receiving elements and the fixed-side light elements 233 to 236 may be light-emitting elements. In this case, the rotation-side electric circuit portion 11 comprises the receiver circuits 2111 to 2114, the switching circuit 2120, and the I/F circuits 2121 to 2124 and the fixed-side electrical circuit portion 21 comprises the I/F circuits 111 to 114 and the driver circuits 115 to 118.

Figure 13:
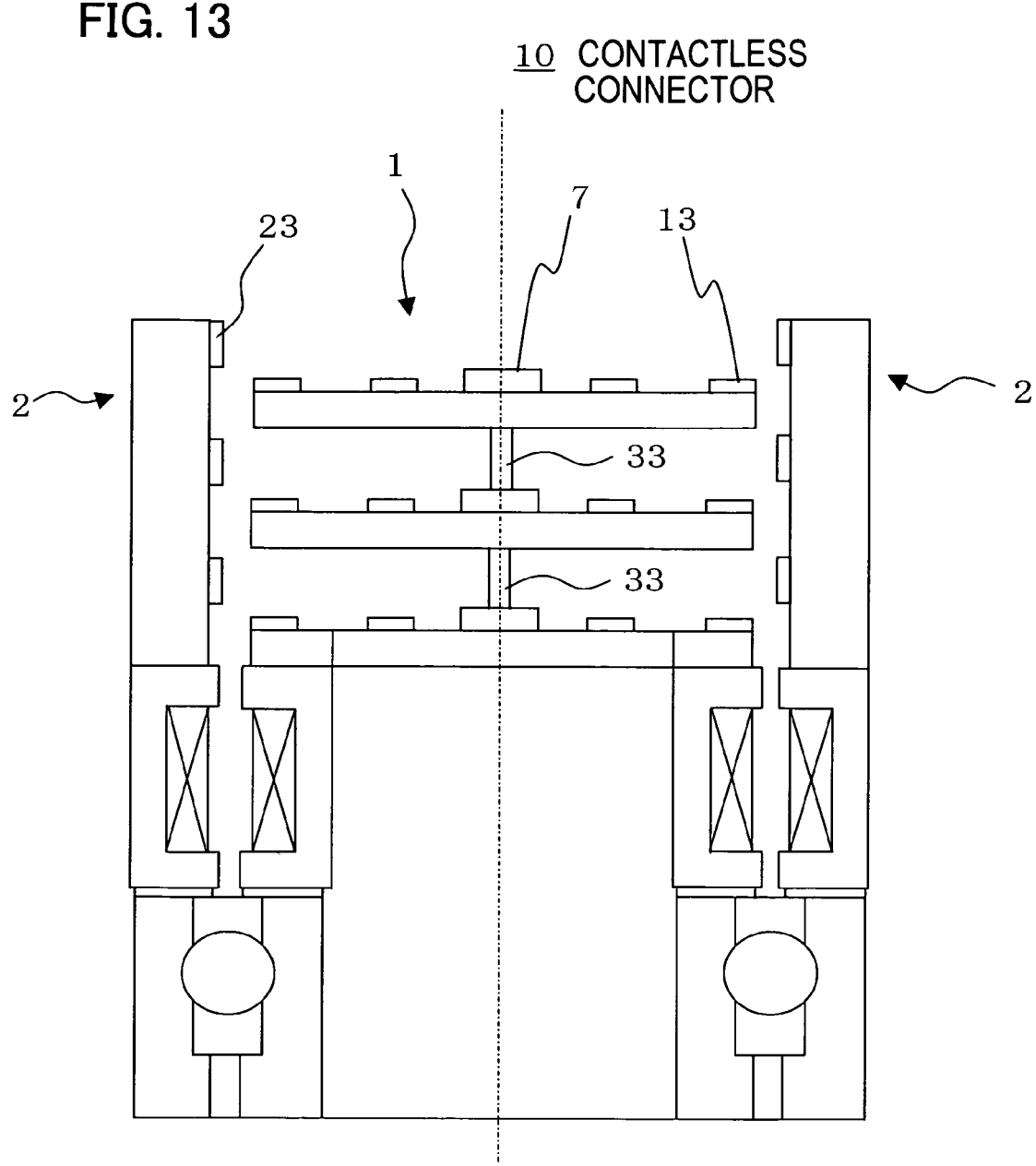
FIG. 13 shows an example of contactless connectors arranged in a plurality of stages.

In the above example, an example where a light path is formed by the rotation-side light element 13, fixed-side light element 23, and reflective body 7 was described. In addition, as shown in FIG. 13, the rotation-side light element 13 and fixed-side light element 23 may be arranged in plural stages substantially parallel to the axis of rotation 4. Data of multiple channels can also be sent and received as a result of the plural-stage arrangement. In this case, the fixed-side light elements 23 are provided on the side of the fixed body 2 and the abovementioned unbroken light path is constituted between the fixed-side light element 23 and rotation-side light element 13 in each stage. Further, the rotation-side light element 13 and fixed-side light element 23 may be arranged in pluralities as mentioned earlier in each stage, and the light-emitting elements and light-receiving elements may have a mixed arrangement. Each stage on the rotating body 1 is connected by a shaft 33 and rotatably attached in accordance with the rotation of the rotating body 1.

Moreover, an unbroken light path can also be formed by a fixed-side optical fiber and a rotation-side optical fiber by replacing the rotation-side light elements 13 and fixed-side light elements 23 with optical fibers.

What is claimed is:

1. A contactless connector having a rotation-side light element and a fixed-side light element, for sending and receiving signals between the rotation-side light element and the fixed-side light element contactlessly, comprising:

a rotating body which rotates about an axis of rotation, a fixed body; and a reflective body which reflects light emitted from the rotation-side light element or the fixed-side light element in the rotation-axis position, wherein the rotation-side light element is provided on the rotating body, the fixed-side light element is provided on the fixed body, the reflective body forms a light path between the rotation-side light element and the fixed-side light element, the light path is substantially orthogonal to the axis of rotation; and the light path is formed via the reflective body between the rotation-side light element and the fixed-side light element so that the rotation-side light element or the fixed-side light element receives reflected light from the reflective body; the contactless connector further comprising:

a detection portion that detects the rotation speed or rotation angle of the rotating body; and a reflective body driving portion that controllably drives the rotation speed or rotation angle of the reflective body by using data detected by the detection portion.

2. The contactless connector according to claim 1, wherein the rotation-side light element is provided on a disk face of the rotating body that is orthogonal to the axis of rotation, and the fixed-side light element is provided on a planar face of the fixed body that is substantially parallel to the disk face of the rotating body.

3. The contactless connector according to claim 1, further comprising:
a computing portion that computes the rotation speed or rotation angle of the reflective body to constitute the light path from the rotation-side light element to the fixed-side light element by using the data detected by the detection portion.

4. The contactless connector according to claim 1, wherein the reflective body driving portion inputs a value of half of the rotation speed or rotation angle of the rotating body when the rotation body is rotating, further comprising:
a connector portion that always connects the light path of the light from the rotation side light element to the fixed side light element; and
a switch portion that switches the light path of the light from one of the fixed-side light element to another fixed-side light element.

5. The contactless connector according to claim 1, wherein a plurality of the rotation-side light elements are provided in any position on a disk face of the rotating body; and a plurality of the respective fixed-side light elements are provided on the fixed body so that the light path is formed between the respective fixed-side light elements and the respective rotation-side light elements via the reflective body when the fixed-side light element is located on a light path line segment of incidence and reflection of the reflective body with the respective rotation-side light element.

6. The contactless connector according to claim 1, wherein the rotation-side light element further comprises a rotation-side light-emitting element and a rotation-side light receiving element, the fixed-side light element further comprising a fixed-side light-emitting element and a fixed-side light-receiving element, the rotation-side light-emitting element and the rotation-side light-receiving element are mixed and arranged in any position on a disk face of the rotation body, the fixed-side light-emitting element and the fixed-side light-receiving element are mixed and arranged on the fixed body; and the fixed-side light-emitting element and the fixed-side light-receiving element are mixed and arranged so that, when the fixed-side light-emitting element or the fixed-side light-receiving element is located on a light path line segment of incidence and reflection of the reflective body with the rotation-side light-receiving element or the rotation-side light-emitting element, the light path is formed respectively between the rotation-side light-receiving element and the rotation-side light-emitting element via the reflective body.

7. The contactless connector according to claim 1, wherein the rotation-side light element and the fixed-side light element, which are on a face that is substantially perpendicular to the axis of rotation, are provided on a plurality of stages respectively substantially perpendicular to the axis of rotation on the rotating body, and the light path is formed between the rotation-side light element and the fixed-side light element in each stage.

8. The contactless connector according to claim 1, further comprising:
a switching portion for inputting data which is received by the rotation-side light element or the fixed-side light element, and for outputting the data to a desired output terminal among a plurality of output terminals.

9. The contactless connector according to claim 1, further comprising:
a rotating transformer that is constituted by a transformer core and a transformer winding for each of the rotating body and the fixed body.

10. The contactless connector according to claim 1, wherein the fixed-side light element is provided at a different height from that of the rotation-side light element in the direction of the axis of rotation, and the rotation-side light element is provided at an angle so that the light path is formed between the rotation-side light element and the fixed-side light element, with respect to a planar disk of the rotating body that is orthogonal to the axis of rotation.

11. The contactless connector according to claim 1, further comprising a reflective face provided at a predetermined distance from the axis of the rotation, so that the reflective body prevents obstruction of the light path between the rotation-side light element and the fixed-side light element.

* * * * *